(12) United States Patent
Oberndorfer

(10) Patent No.: US 11,851,170 B2
(45) Date of Patent: Dec. 26, 2023

(54) DRONE ROTOR CAGE

(71) Applicant: Intel Corporation, Santa Clara, CA (US)

(72) Inventor: Fabian Oberndorfer, Krailling (DE)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 17/002,466

(22) Filed: Aug. 25, 2020

(65) Prior Publication Data

US 2021/0001977 A1 Jan. 7, 2021

Related U.S. Application Data

(63) Continuation of application No. 15/721,126, filed on Sep. 29, 2017, now Pat. No. 10,780,979.

(60) Provisional application No. 62/421,928, filed on Nov. 14, 2016.

(51) Int. Cl.

| | |
|---|---|
| *B64C 27/00* | (2006.01) |
| *B64C 39/02* | (2023.01) |
| *B64C 11/20* | (2006.01) |
| *B64C 11/00* | (2006.01) |
| *B64U 10/00* | (2023.01) |
| *B64U 30/20* | (2023.01) |

(52) U.S. Cl.
CPC .......... *B64C 27/006* (2013.01); *B64C 11/205* (2013.01); *B64C 39/024* (2013.01); *B64C 11/00* (2013.01); *B64U 10/00* (2023.01); *B64U 30/20* (2023.01)

(58) Field of Classification Search
CPC .... B64C 27/006; B64C 11/205; B64U 30/299
See application file for complete search history.

(56) References Cited

U.S. PATENT DOCUMENTS

| | | | |
|---|---|---|---|
| 3,394,906 A | 7/1968 | Lester | |
| 5,672,086 A | 9/1997 | Dixon | |
| 7,255,623 B2 | 8/2007 | Davis | |
| 8,113,905 B2 | 2/2012 | Davis | |
| 9,914,538 B2 * | 3/2018 | Yu | B64C 27/20 |
| 10,604,243 B2 * | 3/2020 | Tian | B64C 39/024 |
| 10,780,979 B2 | 9/2020 | Oberndorfer | |
| 2014/0131507 A1 | 5/2014 | Kalantari et al. | |

(Continued)

OTHER PUBLICATIONS

"U.S. Appl. No. 15/721,126, Non Final Office Action dated Aug. 12, 2019", 23 pgs.

(Continued)

*Primary Examiner* — Philip J Bonzell
(74) *Attorney, Agent, or Firm* — Schwegman Lundberg & Woessner, P.A.

(57) ABSTRACT

Disclosed is a drone rotor cage. The drone rotor cage may include a motor housing, a plurality of spars, and a plurality of ribs. The plurality of spars may extend from the motor housing. Each of the plurality of spars may have a spar height and a spar thickness. The spar height may be greater than the spar thickness. Each of the ribs may extend from a respective one of the plurality of spars. Each of the plurality of ribs may have a rib height and a rib thickness. The rib height may be greater than the rib thickness. The plurality of spars and the plurality of ribs may define a space sized to allow a rotor to spin freely when the rotor cage is attached to a drone.

11 Claims, 6 Drawing Sheets

(56) References Cited

U.S. PATENT DOCUMENTS

| | | |
|---|---|---|
| 2016/0023755 A1 | 1/2016 | Elshafei et al. |
| 2016/0221671 A1 | 8/2016 | Fisher et al. |
| 2017/0144753 A1 | 5/2017 | Yu |
| 2017/0341725 A1 | 11/2017 | Skahan |
| 2018/0134378 A1 | 5/2018 | Oberndorfer |
| 2018/0134379 A1 | 5/2018 | Sugaki et al. |
| 2018/0155016 A1 | 6/2018 | Tian et al. |
| 2019/0009924 A1 | 1/2019 | Neely |

OTHER PUBLICATIONS

"U.S. Appl. No. 15/721,126, Response filed Feb. 12, 2020 to Non Final Office Action dated Aug. 12, 2019", 14 pgs.

"U.S. Appl. No. 15/721,126, Final Office Action dated Apr. 24, 2020", 9 pgs.

"U.S. Appl. No. 15/721,126, Response filed May 6, 2020 to Final Office Action dated Apr. 24, 2020", 9 pgs.

"U.S. Appl. No. 15/721,126, Notice of Allowance dated May 18, 2020", 7 pgs.

U.S. Appl. No. 15/721,126 U.S. Pat. No. 10,780,979, filed Sep. 29, 2017, Drone Rotor Cage.

\* cited by examiner

DRONE ROTOR CAGE

CROSS-REFERENCE TO RELATED APPLICATIONS

This application is a continuation of U.S. patent application Ser. No. 15/721,126, filed Sep. 29, 2017, which is related to and claims priority to U.S. Provisional Application No. 62/421,928 filed on Nov. 14, 2016, each of which is hereby incorporated in its entirety.

TECHNICAL FIELD

Embodiments described generally herein relate to drones. Some embodiments relate to a drone rotor cage.

BACKGROUND

An unmanned aerial vehicle (UAV), commonly known as a drone, is an aircraft without a human pilot aboard. The size of drones may range from small hobby scale suitable for close range operation proximate a user to large scale systems capable of hauling large payloads over many miles. Drones may be used to provide services, perform military operations, or as a hobby.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document. The drawings are not necessarily drawn to scale and some dimensions may be exaggerated for clarity.

DETAILED DESCRIPTION

Drone usage is becoming more and more common as prices for drones decrease and the capabilities of drones increase. For example, as disclosed herein, drones may be programmed to launch, flying a predefined flightpath, illuminate one or more onboard light emitting diodes (LED), and recover to a predetermined location. All of these activities may be accomplished without user intervention. With the increased drone capabilities and decreased costs, drone usage may be implemented in a variety of entertainment, safety, or emergency scenarios.

In general, drones may include any number of rotors, with four being common. Rotor controllers may be used to control the rotors. The rotor controller may control one or more rotors. Each rotor may also include a motor.

During flight, one or more of the rotors may fail. The failure may be due to, among other things, motor failure, a rotor controller failure, or physical damage to a rotor blade. When one or more of the rotors fail, the drone may become unstable or otherwise incapable of maintaining flight. For example, if two adjacent rotors on a quadcopter fail, one side of the quadcopter may begin to fall and cause the quadcopter to no longer be able to maintain a horizontal attitude or level flight.

In addition to rotor failure the spinning rotors may present a hazard. For instance, when the rotor blades are spinning at a high rate of speed, the rotor blades may be difficult to see. As a result, the spinning rotor blades may cause injury to operators or spectators.

As disclosed herein, a cage may be placed around each of the rotors. The cage may serve multiple purposes. For example, the cages may protect persons or property from the spinning rotor blades. In addition, the cages may be constructed such that during a rotor failure, the cages may assist in keeping the drone in a substantially horizontal state so that the drone may land safely.

Figure 1A:
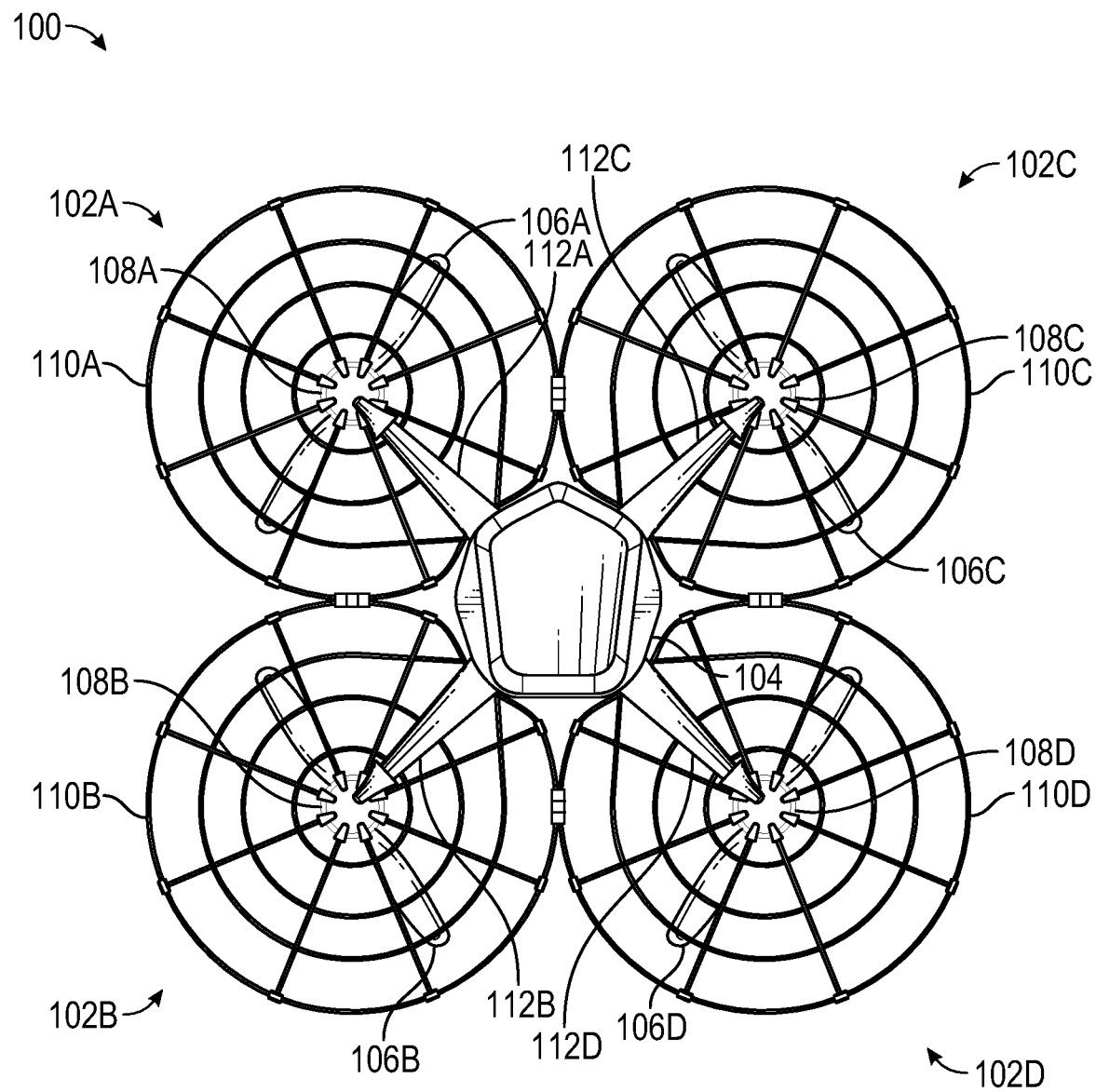
FIGS. 1A and 1B illustrate an example schematic of a drone in accordance with some embodiments.
Figure 1B:
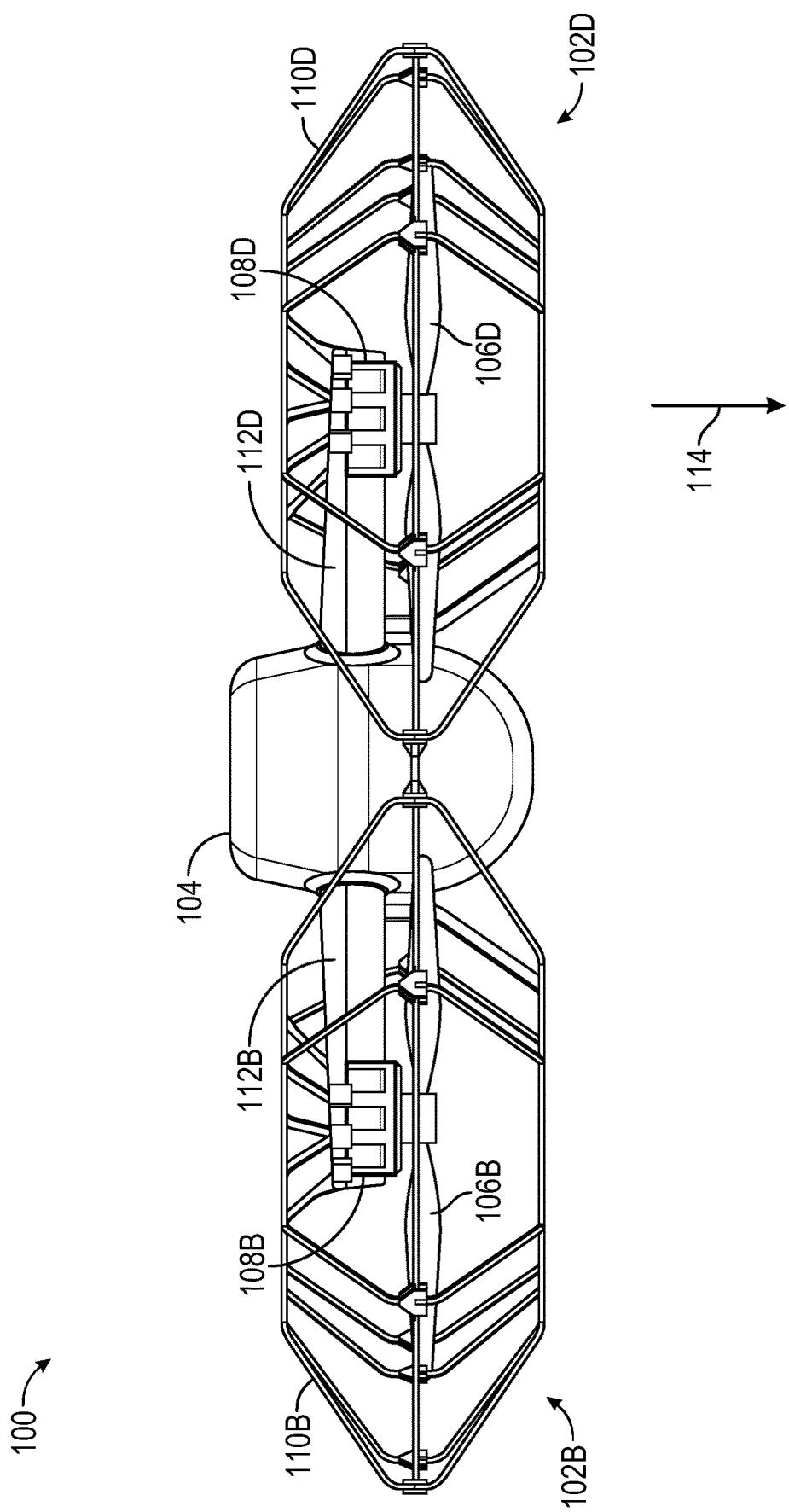

FIGS. 1A and 1B illustrate an example schematic of a drone 100 in accordance with some embodiments. The drone 100 may include rotors 102A, 102B, 102C, and 102D (collectively rotors 102) that may be attached to an airframe 104. Each of the rotors 102 may include a rotor blade 106A, 106B, 106C, and 106D (collectively rotor blades 106) and a motor 108A, 108B, 108C, and 108D (collectively motors 108). The rotors 102 may be surrounded by a cage 110A, 110B, 110C, and 110D (collectively cages 110) and attached to the airframe 104 by rotor arms 112A, 112B, 112C, and 112D.

During operation, the rotor blades 106 may spin at a high speed and generate lift to propel the drone 100 through the air. Depending on the speed of the rotor blades 106 and the attitude of the drone 100, the drone 100 may climb or descend. For example, if the drone 100 is in a level attitude, and the rotor blades 106 begin spinning at a faster speed, the drone 100 may climb. If the rotor blades begin spinning at a slower speed, the drone 100 may descend.

If the drone 100 is not in a level attitude, increases or decreases in rotor blade 106 speeds may cause the horizontal and vertical components of lift to increase or decrease. Thus, increasing or decreasing the rotor blade 106 speed, may cause the drone to move horizontally as well as climb or descend. As a result, should one or more of the rotors 102 malfunction, the drone 100 may develop asymmetric lift or otherwise result in the drone 100 being in an unusual attitude. For example, should rotors 102C and 102D malfunction, one side of the drone 100 may descend as indicated by arrow 114. Other combinations of rotor failure may also cause asymmetric lift.

The descending of one side of the drone 100 may cause a loss of flight control. For example, as one side of the drone 100 descends, the other side of the drone 100 may be forced into a vertical position. The result, may be that the remaining functional rotors may not be in a position to generate vertical lift and instead may generate horizontal lift. The horizontal lift may further aggravate the unusual attitude and loss of flight control.

As disclosed herein, the cages 110 may provide an aerodynamic effect such that during a rotor malfunction, the cages 110 may assist in maintaining a horizontal attitude. Thus, during a rotor malfunction, the cages 110 may assist in maintaining flight control to assist in landing the drone 100. The aerodynamic effect may be created by the shape of the cages 110. In addition, the remaining functional rotors 106 may be adjusted to assist with a controlled landing during a rotor malfunction as disclosed herein.

While FIGS. 1A and 1B show a rotor cage for each rotor, embodiments may include a rotor cage surrounding more than one rotor. For example, a single rotor cage may surround two or more sets of rotor blades. Thus, the drone 100 may have two rotor cages sounding the rotor blades 106.

Figure 2A:
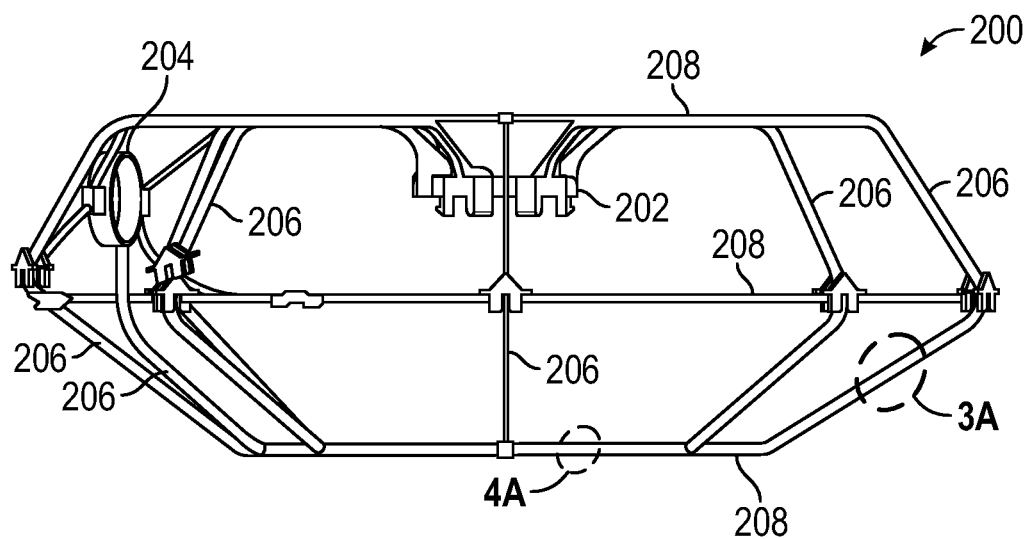
FIGS. 2A and 2B illustrate an example rotor cage in accordance with some embodiments.
Figure 2B:
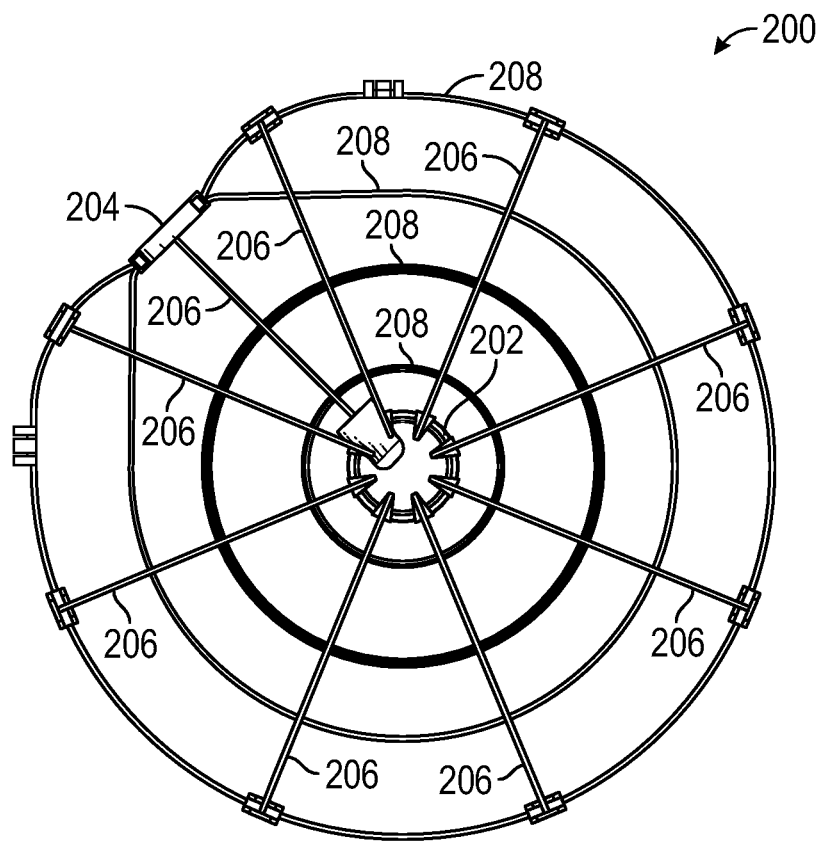

FIGS. 2A and 2B illustrate a cage 200 (such as one of the cages 110) in accordance with some embodiments. As shown in FIGS. 2A and 2B, the cage 200 may include a rotor motor housing 202 and a rotor arm connector 204. The rotor arm connector 204 and the rotor motor housing 202 may allow the cage 200 to connect to the drone 100 at multiple locations.

Figure 3A:
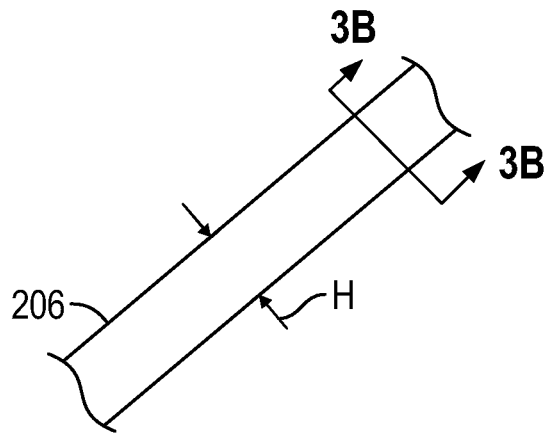
FIGS. 3A and 3B illustrate an example rib in accordance with some embodiments.
Figure 3B:
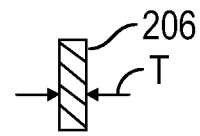
Figure 4A:
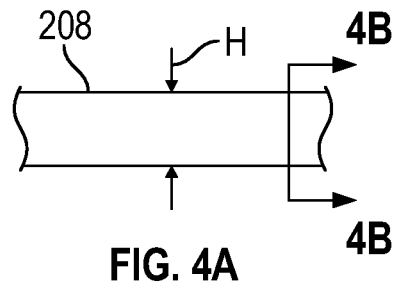
FIGS. 4A and 4B illustrate an example spar in accordance with some embodiments.
Figure 4B:
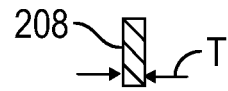

The cage 200 may also include ribs 206 and spars 208. As shown in FIGS. 3A and 3B the ribs 206 may have a height, H, that is greater than a thickness, T. FIGS. 4A and 4B show that the spars 208 may have a height, H, that is greater than a thickness, T. The thickness of the spars 208 and the ribs 206 may be the same or may be different. The height of the spars 208 and the height of the ribs 206 may be the same or may be different. The height of the spars 208 and the height of the ribs 206 may be twice the thickness of the ribs 206 and the spars 208.

By having the height be greater than the thickness, when the drone 100 is in an unusual attitude, possibly caused by a rotor failure, a surface area of the ribs 206 and the spars 208 facing in a downward direction may increase. The increased surface area may cause an increase in drag experienced by drone 100, the rotors 102, etc. The increase in drag, coupled with a decrease in lift by the functional rotors, may allow the drone 100 to land in a horizontal attitude. Stated another way, when one or more rotors 102 of the drone 100 fail, drag created by the cages 110 may allow the drone 100 to descend in a controlled manner using the functioning rotors 102.

For example, as disclosed herein, the drone 100 may include one or more accelerometers that can detect when the drone 100 tilts more than a preset amount of tilt. For instance, when a rotor fails, the drone 100 may tilt more than 15° and the accelerometers may detect this tilt. The tilt may signify a failed rotor or other malfunction. Once the failed rotor is detected, the power to any remaining functioning rotors may be cut so that the aerodynamic effects of the cages 110 may cause the drone 100 to descend in a horizontal configuration.

The size and shape of the ribs 206 and the spares 208 may be such that the ribs 206 and the spars 208 have a predetermined drag coefficient. For example, the height of the spars 208 and the height of the ribs 206 may be twice the thickness of the ribs 206 and the spars 208. The difference in the dimensions may result in the ribs 206 and the spars 208 having a drag coefficient ranging from about 0.7 to about 1.2.

Figure 5:
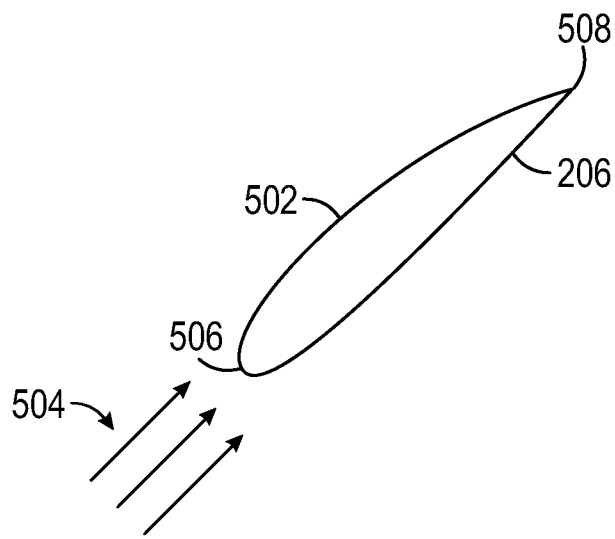
FIG. 5 illustrates a rib in accordance with some embodiments.

In addition to the height being greater than the thickness, the ribs 206 and the spars 208 may be shaped as airfoils. For example, as shown in FIG. 5, the ribs 206 may be shaped such that an upper surface 502 of the rib 206 may generate lift as airflow 504 contacts a leading edge 506 of the rib 206 and flows towards to trailing edge 508. The leading edge 506 and the trailing edge 508 may define a cord line, which may be used to define an angle of attack for the ribs 206 and the spars 208.

Figure 6:
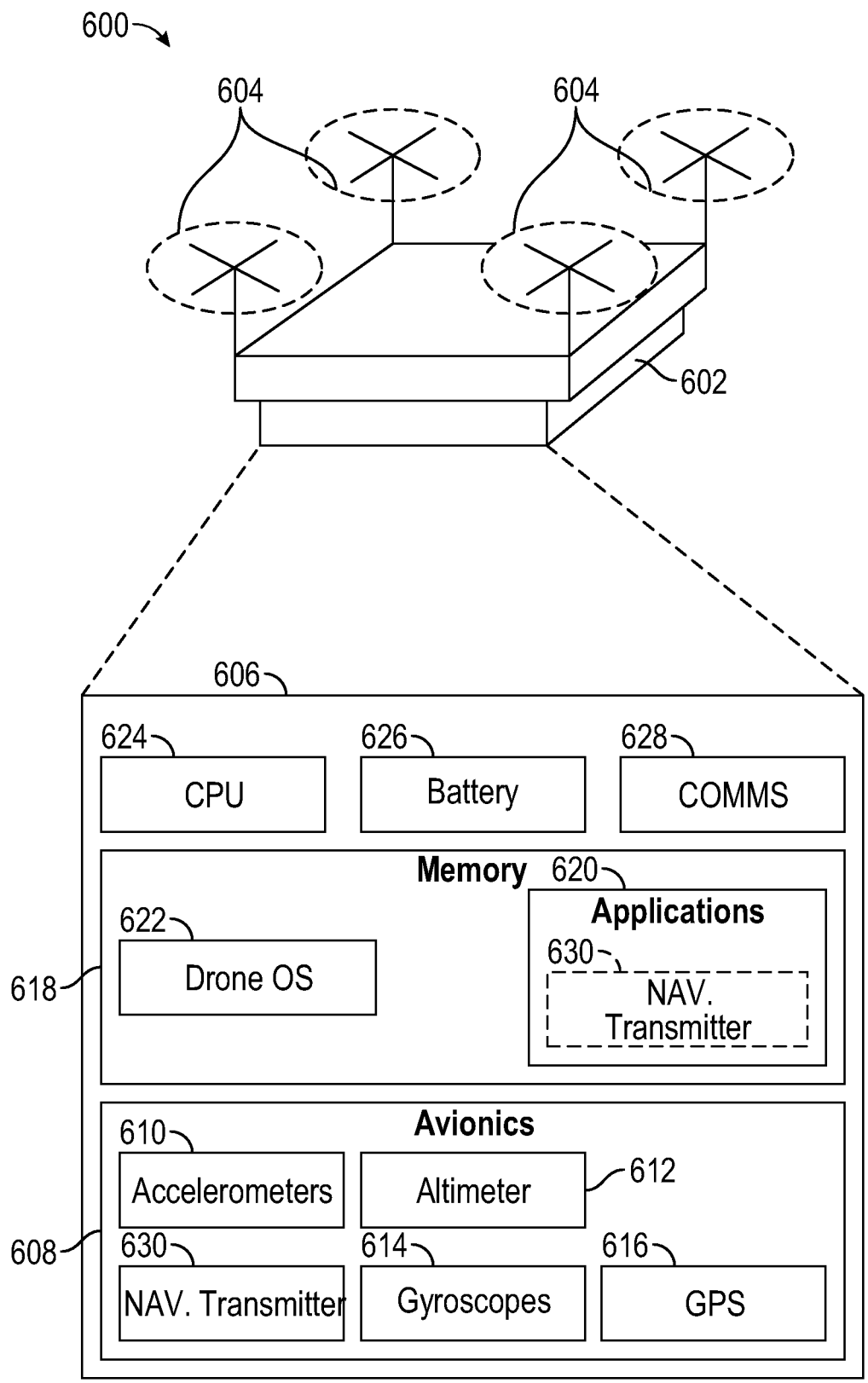
FIG. 6 illustrates an example schematic of a drone in accordance with some embodiments.

Turning now to FIG. 6, FIG. 6 shows an example schematic of a drone 600 (such as the drone 100 in FIGS. 1A and 1B) in accordance with some embodiments. As shown in FIG. 6, the drone 600 may include the airframe 602, a flight mechanism 604 (such as the rotors 102), and computing environment 606. The airframe 602 may be made of made of polymers, metals, etc. and the other components of the drone 600 may be secured to the airframe 104.

The flight mechanism 604 may include mechanisms that may propel the drone 600 through the air. For example, the flight mechanism 604 may include rotors, turbofans, turboprops, etc. The flight mechanism 604 may operably interface with avionics 608. The avionics 608 may be part of the computing environment 606 (as shown in FIG. 6) or standalone components. For example, the avionics 608 may include accelerometers 610, an altimeter 612, gyroscopes 614, and a GPS receiver 616.

The various components of the avionics 608 may be standalone components or may be part of an autopilot system or other avionics package. For example, the altimeter 612 and GPS receiver 616 may be part of an autopilot system that includes one or more axes of control. For instance, the autopilot system may be a two-axis autopilot that may maintain a preset course and hold a preset altitude. The avionics 608 may be used to control in-flight orientation of the drone 600. For example, the avionics 608 may be used to control orientation of the drone 600 about pitch, bank, and yaw axes while in flight. In addition, the avionics 608 may assist in landing the drone 600 in a controlled matter should a rotor failure occur.

The avionics 608 may allow for autonomous flight. For example, as described herein, the drone 600 may receive a flightpath that the drone 600 may fly without further user input. In addition, the avionics 608 may include a navigation transmitter 630 that may be used to transmit commands to the flight mechanism 604. While FIG. 6 shows the navigation transmitter 630 as part of the avionics 608, the navigation transmitter 630 may be software stored in a memory 618 as shown by dashed navigation transmitter 630.

The computing environment 606 may also include the memory 618 that may store applications 620 and a drone operating system (OS) 622. The applications 620 may include a communications program that may allow drone 600 to communicate with remote controls, other drones, and computing devices. In addition, the applications 620 may include software that functions as the navigation transmitter 630.

The computing environment 606 may include a central processing unit (CPU) 624, a battery 626, and a communications interface 628. The CPU 624 may be used to execute operations and method steps, such as those described herein with regard to FIG. 7. The memory 618 also may store data received by the drone 600 as well as programs and other software utilized by the drone 600. For example, the memory 618 may store instructions that, when executed by the CPU 624, cause the CPU 642 to perform operations such as those described herein.

The communications interface 628 may include transmitters, receivers, or transceivers that may be used to communicate with a computing device. For example, the communications interface 628 may include an automatic dependent surveillance-broadcast (ADS-B) receiver (ADS-B In) or transmitter (ADS-B Out) that may send and receive data. In addition, the communications interface 628 may include a cellular interface or other wireless credential exchange modules. For example, the communications interface 628 may include an ADS-B In-and-Out module that allows the drone 600 to transmit its position and any error messages or other flight status to a user.

While FIG. 6 shows various components of the drone 600, not all components shown in FIG. 6 are required. For example, drone 600 may not have the gyroscopes 614, the altimeter 614, etc.

Figure 7:
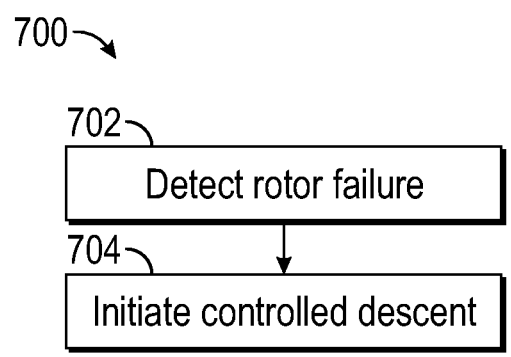
FIG. 7 illustrates an example method in accordance with some embodiments.

FIG. 7 illustrates an example method 700 in accordance with some embodiments disclosed herein. The method 700 may begin at stage 702 where a drone may detect a rotor failure. The rotor failure may be detected via a variety of manners. For example, the applications 620 may detect a voltage or current drop or spike for any one of the rotors 102. In addition, the drone 600 may utilize the gyroscopes 614 or accelerometers 610 to detect an unusual attitude or other condition that results in a bank angle of the drone 600 exceeding a preset value.

Once the rotor failure is detected, the method 700 may proceed to stage 704 where the drone may initiate a controlled descent. For example, upon detecting one or more rotor failures, the drone 600, via drone OS 622 or applications 620, may decrease or increase power to functioning rotors. For instance, if two adjacent rotors failed (e.g., rotors 102C and 102D), the drone 600 may detect an unusual attitude using the gyroscopes 614. As a result, the drone OS 622 or the applications 620 may decrease power to functioning rotors (e.g., rotors 102A and 102B). The power to the functioning rotors may be decreased so as to cause the drone 600 to descend in a level flight attitude or substantially level flight attitude. A substantially level flight attitude may be a flight attitude where the drone 600 may not be in a level flight attitude, but the horizontal movement of the drone 600 caused by the functioning rotors is minimal or within a preset distance. For example, a substantially level flight attitude may include the drone 600 banked at 5 degrees with a lateral displacement of less than 5 feet per 50 feet of altitude lost. The altitude lost and lateral displacement may be measured using the GPS 616 and the altimeter 612.

In addition to decreasing power to the functioning rotors, the drone OS 622 or applications 620 may completely deactivate the functioning rotors. For example, upon detecting a rotor failure, the drone OS 622 or applications 620 may deactivate the functioning rotors such that no lift is being generated by the rotors. The lack of lift may cause the cause the drone 600 to descend. As the drone 600 descends, the aerodynamic effects of the ribs 206 and the spars 208 may cause the drone 600 to descend in a controlled manner.

EXAMPLES

Example 1 is a drone rotor cage comprising: a motor housing; a plurality of ribs extending from the motor housing, each of the plurality of ribs having a rib height and a rib thickness, the rib height being greater than the rib thickness; and a plurality of spars, each of the spars extending from a respective one of the plurality of ribs, each of the plurality of spars having a spar height and a spar thickness, the spar height being greater than the spar thickness, wherein the plurality of ribs and the plurality of spars define a space sized to allow a rotor to spin freely when the rotor cage is attached to a drone.

In Example 2, the subject matter of Example 1 optionally includes wherein the rib height is greater than the rib thickness.

In Example 3, the subject matter of any one or more of Examples 1-2 optionally include wherein the rib height is greater than the rib thickness.

In Example 4, the subject matter of any one or more of Examples 1-3 optionally include wherein the spar thickness and the rib thickness are equal.

In Example 5, the subject matter of any one or more of Examples 1-4 optionally include wherein the spar height and the rib height are equal.

In Example 6, the subject matter of any one or more of Examples 1-5 optionally include wherein the rib height is twice the rib thickness.

In Example 7, the subject matter of any one or more of Examples 1-6 optionally include wherein the spar height is twice the spar thickness.

In Example 8, the subject matter of any one or more of Examples 1-7 optionally include wherein the plurality of spars and the plurality of ribs each includes a leading edge and a trailing edge.

In Example 9, the subject matter of any one or more of Examples 1-8 optionally include wherein each of the plurality of spars have an airfoil shape.

In Example 10, the subject matter of any one or more of Examples 1-9 optionally include wherein each of the plurality of ribs have an airfoil shape.

In Example 11, the subject matter of any one or more of Examples 1-10 optionally include.

Example 12 is a drone comprising: a plurality of rotors attached to an airframe; and a rotor cage surrounding at least one of the plurality of rotors, the rotor cage having a plurality of spars and a plurality of ribs configured to increase drag as the drone descends when at least one of the plurality of rotors fails in flight.

In Example 13, the subject matter of Example 12 optionally includes a motor housing, the motor housing connected to the airframe proximate the rotor, wherein the plurality of ribs extend from the motor housing and each of the plurality of spars extend from a respective one of the plurality of ribs.

In Example 14, the subject matter of any one or more of Examples 12-13 optionally include wherein each of the plurality of ribs has a rib height and a rib thickness, the rib height being greater than the rib thickness.

In Example 15, the subject matter of any one or more of Examples 12-14 optionally include wherein each of the plurality of spars has a spar height and a spar thickness, the spar height being greater than the spar thickness.

In Example 16, the subject matter of Example 15 optionally includes wherein the rib height is greater than the rib thickness.

In Example 17, the subject matter of any one or more of Examples 15-16 optionally include wherein the spar height is greater than the spar thickness.

In Example 18, the subject matter of any one or more of Examples 12-17 optionally include wherein each of the plurality of spars and each of the plurality of ribs each includes a leading edge and a trailing edge.

In Example 19, the subject matter of any one or more of Examples 12-18 optionally include wherein each of the plurality of spars have an airfoil shape.

In Example 20, the subject matter of any one or more of Examples 12-19 optionally include wherein each of the plurality of ribs have an airfoil shape.

In Example 21, the subject matter of any one or more of Examples 12-20 optionally include.

In Example 22, the subject matter of any one or more of Examples 12-21 optionally include a processor; and a memory storing instructions that, when executed by the processor, cause the processor to: detect the rotor failure, and initiate a controlled descent of the drone in response to detecting the rotor failure.

In Example 23, the subject matter of Example 22 optionally includes wherein initiating the controlled descent includes instructions that, when executed by the processor, cause the processor to deactivate the plurality of rotors.

In Example 24, the subject matter of any one or more of Examples 22-23 optionally include wherein initiating the controlled descent includes instructions that, when executed by the processor, cause the processor to adjust a power to at least one of the plurality of rotors to cause the drone to descend in a controlled flight attitude.

In Example 25, the subject matter of any one or more of Examples 22-24 optionally include wherein detecting the rotor failure includes instructions that, when executed by the processor, cause the processor to detect an unusual flight attitude.

In Example 26, the subject matter of any one or more of Examples 12-25 optionally include wherein the rotor cage is one of a plurality of rotor cages.

Example 27 is a method of controlling a drone having an onboard computer operatively connected to a plurality of rotors, the method comprising: detecting, by the onboard computer, a rotor failure; and initiating, by the onboard computer, a controlled descent of the drone in response to detecting the rotor failure.

In Example 28, the subject matter of Example 27 optionally includes wherein initiating the controlled descent includes deactivating the plurality of rotors.

In Example 29, the subject matter of any one or more of Examples 27-28 optionally include wherein initiating the controlled descent includes adjusting a power to at least one of the plurality of rotors to cause the drone to descend in a controlled flight attitude.

In Example 30, the subject matter of any one or more of Examples 27-29 optionally include wherein detecting the rotor failure includes detecting an unusual flight attitude.

In Example 31, the subject matter of Example 30 optionally includes wherein detecting the unusual flight attitude includes detecting a tilt angle greater than a preset tilt.

In Example 32, the subject matter of any one or more of Examples 27-31 optionally include wherein detecting the rotor failure includes detecting a voltage drop across one of the plurality of rotors.

In Example 33, the subject matter of any one or more of Examples 27-32 optionally include wherein detecting the rotor failure includes detecting a voltage spike across one of the plurality or rotors.

In Example 34, the subject matter of any one or more of Examples 27-33 optionally include wherein detecting the rotor failure includes detecting a current drop across one of the plurality of rotors.

In Example 35, the subject matter of any one or more of Examples 27-34 optionally include wherein detecting the rotor failure includes detecting a current spike across one of the plurality or rotors.

Example 36 is at least one computer-readable medium comprising instructions to perform any of the methods of Examples 27-35.

Example 37 is an apparatus comprising means for performing any of the methods of Examples 27-35.

Example 38 is a drone comprising: a plurality of rotors; means for detecting a rotor failure; and means for initiating a controlled descent of the drone in response to detecting the rotor failure.

In Example 39, the subject matter of Example 38 optionally includes wherein the means for initiating the controlled descent includes means for deactivating the plurality of rotors.

In Example 40, the subject matter of any one or more of Examples 38-39 optionally include wherein the means for initiating the controlled descent includes means for adjusting a power to at least one of the plurality of rotors to cause the drone to descend in a controlled flight attitude.

In Example 41, the subject matter of any one or more of Examples 38-40 optionally include wherein the means for detecting the rotor failure includes means for detecting an unusual flight attitude.

In Example 42, the subject matter of Example 41 optionally includes wherein the means for detecting the unusual flight attitude includes means for detecting a tilt angle greater than a preset tilt.

In Example 43, the subject matter of any one or more of Examples 38-42 optionally include wherein the means for detecting the rotor failure includes means for detecting a voltage drop across one of the plurality of rotors.

In Example 44, the subject matter of any one or more of Examples 38-43 optionally include wherein the means for detecting the rotor failure includes means for detecting a voltage spike across one of the plurality or rotors.

In Example 45, the subject matter of any one or more of Examples 38-44 optionally include wherein the means for detecting the rotor failure includes means for detecting a current drop across one of the plurality of rotors.

In Example 46, the subject matter of any one or more of Examples 38-45 optionally include wherein the means for detecting the rotor failure includes means for detecting a current spike across one of the plurality or rotors.

Example 47 is at least one computer readable medium including instructions that, when executed by a processor, cause the processor to: detect a rotor failure; and initiate a controlled descent of the drone in response to detecting the rotor failure.

In Example 48, the subject matter of Example 47 optionally includes wherein initiating the controlled descent includes instructions that, when executed by the processor, cause the processor to deactivate the plurality of rotors.

In Example 49, the subject matter of any one or more of Examples 47-48 optionally include wherein initiating the controlled descent includes instructions that, when executed by the processor, cause the processor to adjust a power to at least one of the plurality of rotors to cause the drone to descend in a controlled flight attitude.

In Example 50, the subject matter of any one or more of Examples 47-49 optionally include wherein detecting the rotor failure includes instructions that, when executed by the processor, cause the processor to detect an unusual flight attitude.

In Example 51, the subject matter of Example 50 optionally includes wherein detecting the unusual flight attitude includes instructions that, when executed by the processor, cause the processor to detect a tilt angle greater than a preset tilt.

In Example 52, the subject matter of any one or more of Examples 47-51 optionally include wherein detecting the rotor failure includes instructions that, when executed by the processor, cause the processor to detect a voltage drop across one of the plurality of rotors.

In Example 53, the subject matter of any one or more of Examples 47-52 optionally include wherein detecting the rotor failure includes instructions that, when executed by the processor, cause the processor to detect a voltage spike across one of the plurality or rotors.

In Example 54, the subject matter of any one or more of Examples 47-53 optionally include wherein detecting the rotor failure includes instructions that, when executed by the processor, cause the processor to detect a current drop across one of the plurality of rotors.

In Example 55, the subject matter of any one or more of Examples 47-54 optionally include wherein detecting the rotor failure includes instructions that, when executed by the processor, cause the processor to detect a current spike across one of the plurality or rotors.

Example 56 is at least one machine-readable medium including instructions that, when executed by processing circuitry, cause the processing circuitry to perform operations to implement of any of Examples 1-55.

Example 57 is an apparatus comprising means to implement of any of Examples 1-55.

Example 58 is a system to implement of any of Examples 1-55.

Example 59 is a method to implement of any of Examples 1-55.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A drone propeller cage comprising:
   a motor housing to provide an opening for a rotor of a drone;
   a rotor arm connector to detachably couple to an arm that supports the rotor of the drone;
   a plurality of ribs extending from the motor housing, the plurality of ribs including at least a first rib and a second rib; and
   a plurality of spars including at least a first spar and a second spar, the first spar located above the rotor arm connector, each of the plurality of ribs coupled to at least one of the plurality of spars, and each of the first and second spars having a spar height and a spar thickness, the spar height being greater than the spar thickness, with each of the first and second spars arranged in a partially or fully circular shape that extends around the motor housing with a continuous spar height and spar thickness;
   the plurality of ribs and the plurality of spars arranged to define a space that is sized to allow a propeller coupled to the rotor of the drone to spin freely when the propeller cage is mounted to the drone.

2. The drone propeller cage of claim 1, each of the first and second ribs having a rib height and a rib thickness, wherein the rib height is greater than the rib thickness.

3. The drone propeller cage of claim 1, wherein the spar height and a rib thickness of at least one respective spar and rib are equal.

4. The drone propeller cage of claim 1, wherein the spar height is at least twice the spar thickness.

5. The drone propeller cage of claim 1, the plurality of spars further including a third spar positioned between the first spar and the second spar.

6. A drone, comprising:
   a plurality of rotors attached to an airframe; and
   at least one propeller cage removably coupled to the airframe, the at least one propeller cage adapted to surround a respective rotor of the plurality of rotors, the propeller cage comprising:
   a motor housing to provide an opening for the respective rotor;
   a rotor arm connector to detachably couple to an arm that supports the respective rotor;
   a plurality of ribs extending from the motor housing, the plurality of ribs including at least a first rib and a second rib; and
   a plurality of spars including at least a first spar and a second spar, the first spar located above the rotor arm connector, each of the plurality of ribs coupled to at least one of the plurality of spars, and each of the first and second spars having a spar height and a spar thickness, the spar height being greater than the spar thickness, with each of the first and second spars arranged in a partially or fully circular shape that extends around the motor housing with a continuous spar height and spar thickness;
   the plurality of ribs and the plurality of spars arranged to define a space that is sized to allow a propeller coupled to the respective rotor to spin freely when the propeller cage is coupled to the airframe.

7. The drone of claim 6, each of the first and second ribs having a rib height and a rib thickness, wherein the rib height is greater than the rib thickness.

8. The drone of claim 6, wherein the spar height and a rib thickness of at least one respective spar and rib are equal.

9. The drone of claim 6, wherein the spar height is at least twice the spar thickness.

10. The drone of claim 6, the plurality of spars further including a third spar positioned between the first spar and the second spar.

11. A cage assembly for a drone, comprising:
   a first drone propeller cage to attach to a first rotor of the drone; and
   a second drone propeller cage to attach to a second rotor of the drone, the first drone propeller cage coupled to the second drone propeller cage;
   each of the first drone propeller cage and the second drone propeller cage comprising:
      a motor housing to provide an opening for a respective rotor;
      a rotor arm connector to detachably couple to an arm that supports the respective rotor;
      a plurality of ribs extending from the motor housing, the plurality of ribs including at least a first rib and a second rib; and
      a plurality of spars including at least a first spar and a second spar, the first spar located above the rotor arm connector, each of the plurality of ribs coupled to at least one of the plurality of spars, and each of the first and second spars having a spar height and a spar thickness, the spar height being greater than the spar thickness, with each of the first and second spars arranged in a partially or fully circular shape that extends around the motor housing with a continuous spar height and spar thickness;
   the plurality of ribs and the plurality of spars arranged to define a space that is sized to allow a propeller coupled to the respective rotor to spin freely when the cage assembly is mounted to the drone.

* * * * *